Nov. 28, 1933.    G. A. BRAGG    1,936,570
GAS PURIFICATION
Filed Jan. 22, 1932
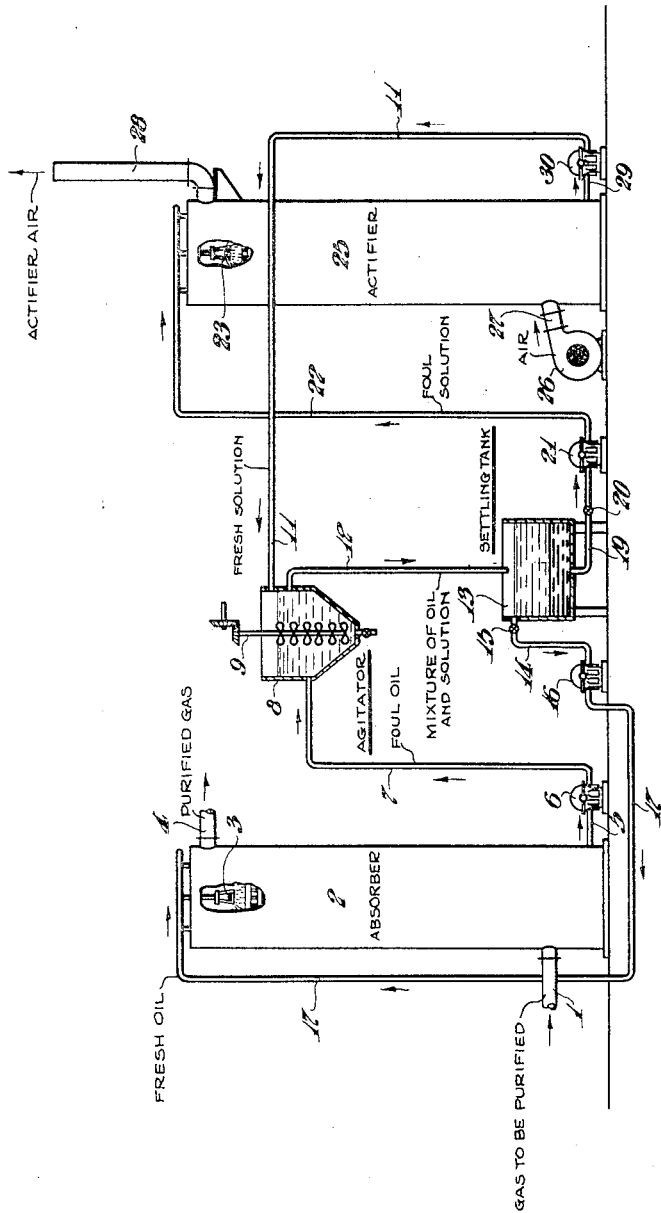
INVENTOR.
Gilbert A. Bragg
BY Jesse R. Langley
ATTORNEY.

Patented Nov. 28, 1933

1,936,570

UNITED STATES PATENT OFFICE 1,936,570

GAS PURIFICATION

Gilbert A. Bragg, Pittsburgh, Pa., assignor to The Koppers Company of Delaware, a corporation of Delaware Application January 22, 1932. Serial No. 588,125

2 Claims. (Cl. 23—3)

My invention relates to the treatment of gaseous mixtures for the separation therefrom of hydrogen sulphide and analogous acidic gases such as hydrogen cyanide and carbon dioxide that may be contained therein. My invention has an especial relation to the purification of fuel gases, such as natural gas, oil gas and refinery gas containing large amounts of hydrogen sulphide.

An object of my invention is to provide a process for treating fuel gases or other gaseous mixtures for the removal therefrom of hydrogen sulphide and analogous acidic gases and having certain advantages over processes which have been used for this purpose in the prior art.

A second object of my invention is to provide a process of the character indicated which is especially suitable for the purification or separation at high pressures of gases and gaseous mixtures containing readily condensable condensates.

A further object of my invention is to provide an efficient process of the character indicated in which certain corrosion and other difficulties encountered in the prior art are avoided.

My invention has for further objects such other operative advantages and results as may hereinafter be found to obtain.

My invention contemplates the treatment of the gas or gaseous mixture from which $H_2S$, HCN, $CO_2$, or a mixture of these acidic gases is to be separated with a hydrocarbon oil, preferably under elevated pressure. The gas and oil are maintained in contact for a sufficient time to permit absorption of the acidic impurity or constituent in the oil.

The thereby fouled oil is then removed from the gas and treated, preferably without diminution of pressure, with an aqueous solution, preferably, although not necessarily, of alkaline reaction, such for example, as an aqueous solution containing from 1 to 3% of sodium carbonate. The oil and the aqueous solution are maintained in intimate contact with each other, preferably with agitation, for a sufficient time to permit absorption from the oil into the aqueous solution of $H_2S$ or other acidic impurity or constituent removed from the gas initially treated.

The thereby regenerated hydrocarbon oil, after separation from the aqueous solution, is recirculated over the flowing gas and commences another cycle.

The aqueous solution, having been fouled by contact with the hydrocarbon oil and after separation from the latter, is regenerated in a known manner, as for example, by aerating it at ordinary temperatures, or by heating, depending somewhat upon the nature of the solution employed.

Thus, when a simple solution of sodium carbonate is employed, aeration under ordinary temperatures is the preferred method of regeneration, although gases other than air, for example, flue gas, may be employed for this purpose. Solutions containing alkali-metal compounds of relatively weak acids, such as boric acid and carbolic acid or phenol, and more particularly, solutions of sodium borate and sodium phenolate, may also be employed, the regeneration of such solutions being readily accomplished by heating the same, preferably to the boiling point.

When solutions and regeneration methods of the character indicated above are employed the hydrogen sulphide removed from the gas in the first instance is largely released as such in the regeneration of the aqueous alkaline solution. Where the release or recovery of hydrogen sulphide as such is undesirable, however, solutions of the so-called "sulphur recovery" type may be employed, such for example, as a suspension of ferrous hydroxide in a sodium carbonate solution, or a solution of sodium thioarsenate. When solutions of this type are employed, regeneration is effected by bringing the solution into intimate contact with air, which results in an oxidation of the absorbed $H_2S$ to free sulphur and consequent regeneration of the solution.

The regenerated solution is preferably recirculated for the further treatment of the flowing oil. In the preferred embodiment my process thus comprises a continuous double cycle. The oil passes through a cycle comprising an absorption stage where it is brought into contact with the gas to be purified and an actification stage in which it is regenerated by contact with an alkaline absorbent solution.

The solution is continuously recirculated through a cycle comprising the stage in which it is brought into contact with the previously fouled oil for the actification of the latter and a stage in which the solution is itself actified.

I may use various hydrocarbon oils, such as petroleum distillates and coal tar oils and as a matter of fact may employ any non-aqueous liquid immiscible with water or an aqueous solution and having absorbent properties with respect to acidic gases of the character indicated.

To insure facile separation of the oil and the aqueous solution the oil and solutions should have substantially different specific gravities.

In order that my invention may be fully set forth and understood I now describe with reference to the accompanying drawing, a preferred manner in which it may be practiced and carried out. In this drawing, The single figure is a more or less diagrammatic view, partly in elevation and partly in vertical section, of apparatus for treating a gas or gaseous mixture in accordance with the present invention.

Referring to the drawing, the gas to be purified, for example, natural gas containing large amounts of $H_2S$, is led, preferably under pressure, through a conduit 1 into an absorber 2. The absorber 2 as shown in the drawing comprises a packed tower of conventional design but any other suitable gas and liquid contact apparatus may be substituted at this point.

The gas passes upward through the absorber 2 in countercurrent to a descending flow of hydrocarbon oil introduced through a distributing system 3 to the top of the absorber 2. The gas is thereby purified and passes out of the absorber 2 through an outlet 4 in purified form.

The oil reaching the bottom of the absorber 2, and having been fouled by absorption of $H_2S$ of the gas, is then delivered through a conduit 5, a pump 6 and a conduit 7 to a vessel 8 which is provided with suitable agitation means 9.

An aqueous alkaline absorbing solution, such for example, as a solution containing 2% by weight of sodium carbonate, is introduced to the vessel 8 through conduit 11. In the vessel 8, the oil and solution are intimately mixed, preferably without reduction of pressure. The mixture of the thereby regenerated oil and the thereby fouled solution then passes through a conduit 12 to a settling tank 13.

From the settling tank 13 the regenerated oil passes through a conduit 14 having a regulating valve 15, a pump 16 and a conduit 17 to the distributing system 3 on top of the absorber 2, the oil thus completing its cycle and commencing a new cycle of operation.

The fouled solution from the settling tank 13 passes through a conduit 19 having a regulating valve 20 and pump 21, a conduit 22 and a distributing system 23 to the top of an actifier 25 which may be similar in construction to the absorber 2.

Air or other inert gas is supplied to the bottom of the actifier 25 from the fan 26 through the conduit 27 and passes upward through the actifier 25 in countercurrent to the descending flow of solution, driving off $H_2S$ from the latter and thereby effecting a regeneration of the solution. The actifier air, including the liberated gas or gases, passes out of the upper part of the actifier through a stack 28 leading to the atmosphere or to apparatus for burning the $H_2S$ contained therein, such as a boiler setting.

The regenerated solution reaching the bottom of the actifier 25 is removed through the conduit 29 and is delivered by a pump 30 and conduit 11 to the agitating vessel 8, thus completing its cycle and commencing a new cycle of operation.

Preferably the entire operation is conducted in a continuous and cyclic manner, the absorption of hydrogen sulphide in the absorber, the transfer of hydrogen sulphide from oil to solution in the vessel 8, and the liberation of hydrogen sulphide in the actifier 25 being balanced over any period of time.

By reason of the fact that the gas to be purified is not treated with aqueous solution, corrosion of the gas handling system is substantially entirely eliminated.

Moreover, when the gas contains low boiling hydrocarbon constituents such as hexane, pentane, or the like, the oil rapidly becomes saturated with these hydrocarbons and continued removal and loss of the same is prevented, whereas, on the other hand, the regeneration of the absorbent oil with air or steam or by distillation would result in a continued loss of these valuable constituents through absorption of the same in the recirculating oil and subsequent vaporization in the actification stage.

My invention also avoids the possibility of forming explosive mixtures of hydrocarbons and air which are likely to form under the conditions above noted when the purification of gas is attempted with an aqueous absorbent solution.

It will be obvious to those skilled in the art that my invention is capable of considerable modification and variation in detail from the specific example hereinabove by way of illustrative example and is therefore not to be limited to the details of this example, but is to be construed as of the scope of the claims hereinafter made.

I claim as my invention:

1. The process of separating acidic constituents such as hydrogen sulphide, hydrogen cyanide and carbon dioxide from gaseous mixtures containing the same, which comprises treating the flowing gas aforesaid with a non-aqueous solvent immiscible in water and thereby absorbing said acidic constituent or constituents, removing the fouled solvent from the gas, treating it with an aqueous alkaline absorbent solution to effect a transfer of absorbed acidic constituent or constituents to the latter, separating the solution from the solvent and recirculating the thereby regenerated oil for further treatment of the gaseous mixture, treating the solution to effect a removal of absorbed acidic constituent or constituents therefrom, and recirculating the thereby regenerated solution for further treatment of fouled solvent.

2. The process of separating acidic constituents such as hydrogen sulphide, hydrogen cyanide and carbon dioxide from gaseous mixtures containing the same, which comprises treating the flowing gas aforesaid with a solvent comprising a hydrocarbon oil and thereby absorbing said acidic constituent or constituents, removing fouled solvent from the gas, treating it with an aqueous solution containing sodium carbonate to effect a transfer of absorbed acidic constituent or constituents, separating the thereby fouled solution from the thereby regenerated solvent, aerating the solution to remove absorbed acidic constituent or constituents, recirculating the regenerated solvent over the gaseous mixture for further absorption, and recirculating the regenerated solution for further treatment of the fouled solvent thereby produced.

GILBERT A. BRAGG.